United States Patent

[11] 3,627,702

| [72] | Inventors | Robert Gehm<br>Limburgerhof, Germany;<br>Ernst-Guenther Kastning, deceased, late of<br>Assenheim, Germany by Marie-Louise<br>Hermine Kastning, heiress-at-law and legal<br>representative of minor heirs; Kurt<br>Schneider, Limburgerhof, Germany |
|------|-----------|---|
| [21] | Appl. No. | 849,530 |
| [22] | Filed | Aug. 12, 1969 |
| [45] | Patented | Dec. 14, 1971 |
| [73] | Assignee | Badische Anilen- & Soda-Fabrik<br>Aktiengesellschaft<br>Ludwigshafen, Germany |
| [32] | Priority | Aug. 12, 1968 |
| [33] |  | Austria |
| [31] |  | 7876/68 |

[54] PROCESS FOR THE PRODUCTION OF POLYETHERS OF HIGH MOLECULAR WEIGHT
7 Claims, No Drawings

[52] U.S. Cl. .................................................... 260/2 A,
252/431

[51] Int. Cl. ........................................................ C08g 23/14
[50] Field of Search .......................................... 260/2 EP, 2
A, 615

[56] References Cited
UNITED STATES PATENTS

| 2,969,402 | 1/1961 | Hill et al. ........................ | 260/632 |
| 3,037,943 | 6/1962 | Hill et al. ........................ | 260/2 |
| 3,127,358 | 3/1964 | Hill ................................. | 260/2 |
| 3,167,519 | 1/1965 | Hill et al. ........................ | 260/2 |

*Primary Examiner*—Harold D. Anderson
*Assistant Examiner*—E. Nielsen
*Attorney*—Johnston, Root, O'Keeffe, Keil, Thompson & Shurtleff ABSTRACT: A process for the production of high-molecular-weight polymers of 1,2-alkylene oxides using a catalyst prepared by reacting 1 mole of an alkaline earth metal hexaammoniate and/or an alkaline earth metal amide in liquid ammonia with 0.1 to 1 mole of a 1,2-alkylene oxide and 0.1 to 2 moles of cyanamide and/or dicyandiamide.

PROCESS FOR THE PRODUCTION OF POLYETHERS OF HIGH MOLECULAR WEIGHT

This invention relates to a process for the production of polymers of 1,2-alkylene oxides having a high molecular weight.

Is is known from British Patent, Specification No. 869,116 that alkylene oxides can be polymerized by means of catalysts which consist solely of nitrogen, hydrogen and a metal of group II of the Periodic System having an atomic number from 19 to 57, for example calcium amide. Higher rates of polymerization are achieved however by using, in accordance with the teaching of British Patent, Specification No. 801,031 and U.S. Pat. No. 3,231,515, compounds having the formula: $H_2N-Ca/OR$ in which R denotes an alkyl or aryl radical, which compounds are formed for example in the reaction of calcium amide or calcium hexaammoniate with an epoxide.

It is known that catalysts of alkyline earth metal hexaammoniate, olefin oxide and a nitrile of an organic carboxylic acid may be used to regulate molecular weight.

We have now found that polyethers having a regulable molecular weight can be prepared in good yields by polymerization of 1,2-alkylene oxides in the presence of 0.05 to 10 percent by weight (with reference to the amount of 1,2-alkylene oxide) of a catalyst based on an alkaline earth metal compound by using a catalyst which has been prepared by reacting 1 mole of an alkaline earth metal hexaammoniate and/or an alkaline earth metal amide in liquid ammonia with 0.1 to 1 mole of 1,2-alkylene oxide and 0.1 to 2 moles of cyanamide and/or dicyandiamide.

The catalysts used according to this invention have the advantage over prior art catalysts for the polymerization of alkylene oxides that when an equal amount of alkaline earth metal (with reference to alkylene oxide) is used higher conversion of alkylene oxide to polymer is obtained in the same period of time.

The catalysts used according to the invention may be prepared by reaction of; or interaction between, an alkaline earth metal hexaamoniate having the formula $M(NH_3)_6$ (in which M denotes an alkaline earth metal) and/or an alkaline earth metal amide, a 1,2-alkylene oxide or a mixture of alkylene oxides and cyanamide and/or its dimer, i.e. dicyandiamide. The appropriate strontium, barium and particularly calcium compounds are very suitable as the alkaline earth metal compounds.

The reaction is carried out in liquid ammonia and advantageously at from −78° C. to +133° C. preferably at from −78° C. to room temperature, if necessary in an autoclave. The excess ammonia is evaporated off from the reaction product.

1,2-alkylene oxides having from two to eight carbon atoms are suitable as alkylene oxides for the process according to the invention for the production of the catalyst and for polymerization; of these, propylene oxide-1,2, butylene oxide-1,2, butadiene monoxide-1,2, 1-phenylethylene oxide-1,2, and particularly ethylene oxide and mixtures of these epoxides or alkylene oxides are particularly suitable. Different 1,2-alkylene oxides may be used successively in the polymerization so that block copolymers are formed.

Polymerization is advantageously carried out in the presence of an inert organic solvent or diluent. In the preferred embodiment of the process, the polymerization is carried out in the presence of an inert organic diluent in which the monomers are soluble but the resultant polymer is insoluble. Liquid saturated hydrocarbons and particularly aliphatic hydrocarbons having from about five to 10 carbon atoms have proved to be suitable. If the polymerization temperature is kept below the softening point of the resultant polymer (this being the preferred method) the polymer is obtained in the form of solid fine granules. Generally polymerization at atmospheric pressure while stirring the polymerization mixture is advantageous but it is also possible to use slightly superatmospheric pressure in a closed vessel. The monomer or monomer mixture may be added all at once to the catalyst and solvent or precipitant and thus reacted or may be fed in portions into the reaction mixture. It is also possible, by varying the monomers added during the reaction, to prepare not only homopolymers but also statistical copolymers and block copolymers, for example from ethylene oxide and propylene oxide.

The amount of catalyst is from 0.05 to 10 percent, advantageously from 0.2 to 10 percent, particularly from 0.2 to 5 percent, by weight with reference to the amount of monomers; it is favorable to use a high concentration of catalyst if it is desired to achieve a high yield of polymer at a low polymerization temperature. Polymerization is generally effected at temperatures of from −30° C. to +150° C., preferably below the softening point of the resultant polymer, and particularly at temperatures of from about −10° C. to +60° C. The lower polymerization temperatures are advantageously maintained by external cooling of the polymerization mixture or by evaporative cooling of the inert diluent.

In the polymerization of ethylene oxide by the process according to the invention, polymers with particularly good properties are obtained by beginning the polymerization at about −30° C. and then gradually raising the temperature to about +35° C. The rise in temperature may be appropriately controlled by withdrawing the heat of reaction by means of evaporative cooling and/or external cooling.

Even when the catalyst remains in the alkylene oxide polymers obtainable by the process according to the invention, the properties of the resultant products are very good. Thus polyethylene oxides prepared according to the invention and still containing catalyst are highly effective flocculants which are particularly valuable as assistants for accelerating sedimentation of the solids suspended in aqueous coal-washing liquors.

The parts and percentages given in the following examples and comparative examples are by weight unless stated otherwise. Parts by volume bear the same relation to parts by weight as the liter to the kilogram. The reduced viscosities given are determined in the Ubbelohde viscosimeter with a 0.1 percent by weight aqueous solution of the polymer. The reduced viscosity ($\eta$ red.), which is a measure of the molecular weight of the polymer, is obtained from the specific viscosity ($\eta$ s.p.) by dividing it by the concentration (in g./ml.) (cf. Houben-Weyl, "Methoden der organischen Chemie," 4th edition, Stuttgart 1963, volume XIV/1, page 81).

EXAMPLES 1 to 4

Production of Catalyst A:

Twenty parts (0.5 mole) of calcium chips are brought into solution in 1,000 parts by volume of liquid ammonia (−60° C.) while stirring. Then 11 parts (0.25 mode) of ethylene oxide and 5.6 parts (0.134 mole) of cyanamide are added and the blue reaction mixture has 250 parts of dry n-heptane added to it.

The whole is allowed to stand for a period of 18 hours during which the major portion of the ammonia evaporates. A portion of the organic solvent (about 100 parts) is then distilled off at about 90° to 100° C. to remove residual ammonia and, after cooling, the reaction mixture is made up to 400 parts by volume with dry heptane.

The catalyst is obtained in the form of a suspension in heptane; it settles at the bottom of the reservoir as a grey substance.

One hundred parts of the well homogenized suspension thus contains 5 parts of calcium.

Production of Catalyst B:

The above procedure is followed but 11.1 parts (0.134 mole) of dicyandiamide is used instead of cyanamide.

Production of Catalyst VI (Comparative Catalyst):

The procedure described is followed but 5.5 parts of acetonitrile (0.134 mole) is used instead of cyanamide or diacyandiamide.

Production of Catalyst V2 (Comparative Catalyst):

The procedure for the production of catalyst A is followed but the use of cyanamide is dispensed with.

Polymerization is Carried Out as Follows:

In each of four stirred vessels provided with a carbon dioxide condenser, thermometer and means for supplying nitrogen, 112 parts of n-heptane which has been dried over sodium and 10 parts by volume of the well-homogenized suspension of catalyst A, B, V1 and V2 are placed and cooled with an ice bath to 0° C. while stirring. In each case, 50 parts of liquid ethylene oxide at −20° C. is added to the suspension. After the cooling bath has been removed, the reaction mixture is allowed to stand.

The temperature rises to +19° to +35° C. in the course of 2 to 3 hours (cf. table) and then falls to room temperature again after a total of 6 hours.

A thick slurry of suspended polyethylene oxide forms in the flask. The slurry is freed from precipitant by suction filtration and the polyethylene oxide then dried at room temperature in vacuo.

The results are given in the table, in which the following abbreviations are used:

Ex = Example No. (Comparative Experiments = C.)
Cat = catalyst
T = time in hours
Temp = temperature reached in °C.
YP = yield of polymer in parts
Y% = yield of polymer in percent
Visc = viscosity of polymer, $\eta$ red g./100 ml. water

| Ex. | Cat. | T | Temp. | YP | Y% | Visc. |
|---|---|---|---|---|---|---|
| 1 | A | 6 | 30 | 45 | 90 | 14.9 |
| 2 | B | 6 | 22 | 40 | 80 | 14 |
| 3C | V1 | 6 | 19 | 22 | 44 | 11 |
| 4C | V2 | 6 | 19 | 16 | 32 | 12.6 |

What we claim is:

1. A process for the production of solid polyethers which comprises polymerizing a 1,2-alkylene oxide in the presence of 0.05 to 10 percent by weight, with reference to the 1,2-alkylene oxide, of a catalyst which has been prepared by (1) reaction in liquid ammonia of:
   a. 1 mole of a calcium compound selected from the group consisting of hexaammoniates, amides and mixtures thereof, with
   b. 0.1 to 1 mole of a 1,2-alkylene oxide and
   c. 0.1 to 2 moles of a compound selected from the group consisting of cyanamide, dicyandiamide and mixtures thereof, and (2) removal of excess ammonia.

2. A process as claimed in claim 1 wherein said polymerization is carried out in an inert liquid organic diluent in which the 1,2-alkylene oxide is soluble while the resultant solid polymer is insoluble.

3. A process as claimed in claim 1 wherein a plurality of 1,2-alkylene oxides are reacted in succession to form a solid block copolymer.

4. A process as claimed in claim 1 wherein the 1,2-alkylene oxide being polymerized is a member selected from the group consisting of ethylene oxide, propylene oxide and mixtures thereof.

5. A process as claimed in claim 1 wherein the compound reacted as component (c) of the catalyst is cyanamide.

6. A process as claimed in claim 1 wherein the compound reacted as component (c) of the catalyst is dicyandiamide.

7. A process as claimed in claim 1 wherein the 1,2-alkylene oxide reacted as component (b) of the catalyst is ethylene oxide.

* * * * *

PO-1050
(5/69)

UNITED STATES PATENT OFFICE
CERTIFICATE OF CORRECTION

Patent No. 3,627,702     Dated December 14, 1971

Inventor(s) Robert Gehm et al

It is certified that error appears in the above-identified patent and that said Letters Patent are hereby corrected as shown below:

First page, left-hand column, eleventh line, "Anilen-" should read -- Anilin- --.

Column 1, line 6, "Patent," should read -- Patent --; line 12, "Patent," should read -- Patent --.

Column 2, line 51, "mode" should read -- mole --.

Signed and sealed this 13th day of June 1972.

(SEAL)
Attest:

EDWARD M. FLETCHER, JR.
Attesting Officer

ROBERT GOTTSCHALK
Commissioner of Patents